United States Patent
Miyawaki et al.

[11] Patent Number: 6,041,832
[45] Date of Patent: Mar. 28, 2000

[54] WIRE TWIST-PREVENTING DEVICE IN WINDING MACHINE

[75] Inventors: Noburo Miyawaki, Hiratsuka; Yuuki Kohno, Machida; Yohji Ohmori, Ebina; Kunitomo Ishiguro, Odawara; Masahiko Watanabe, Hadano, all of Japan

[73] Assignee: Odawara Engineering Company Limited, Kanagawa, Japan

[21] Appl. No.: 09/127,818

[22] Filed: Aug. 3, 1998

[30] Foreign Application Priority Data

Sep. 24, 1997 [JP] Japan ................................... 9-258460

[51] Int. Cl.$^7$ ...................................................... B21F 3/04
[52] U.S. Cl. ............................................. 140/92.1; 57/294
[58] Field of Search .............................. 140/92.1; 57/293, 57/294

[56] References Cited

U.S. PATENT DOCUMENTS

| | | | |
|---|---|---|---|
| 3,722,203 | 3/1973 | Akachi | 57/293 |
| 4,586,327 | 5/1986 | Oestreich | 57/293 |
| 5,265,814 | 11/1993 | Stralka | 57/294 |

*Primary Examiner*—Lowell A. Larson
*Attorney, Agent, or Firm*—Armstrong, Westerman, Hattori, McLeland and Naughton

[57] ABSTRACT

A wire twist-preventing device in a winding machine of the invention comprises a flyer for forming a coil by winding a plurality of wires, which are arranged parallel with one another in a tape shape, around a winding frame having a plurality of winding stages which gradually increase upward in winding diameter, when the winding frame is lowered stage by stage, a dummy flyer which is rotated together with the flyer; and a dummy drum rotatably provided coaxially with the winding frame and having a circumferential length which is substantially equal to an average circumferential length of the winding frame, wherein the wires are wound around the winding frame by the flyer while they are wound around the dummy drum by the dummy flyer.

8 Claims, 9 Drawing Sheets

NORMAL ROTATION OF A FLYER

INITIAL STATE
OF WINDING

FIG.3

NORMAL ROTATION OF A FLYER

FIG.4

INITIAL STATE OF
REVERSE ROTATION
OF A FLYER

FIG.5

REVERSE ROTATION OF A FLYER

WIRE TWIST-PREVENTING DEVICE IN WINDING MACHINE

BACKGROUND OF THE INVENTION

1. Field of the Invention

The invention relates to a wire twist-preventing device for preventing twisting when wires are wound around a winding frame using a vertical coil winding machine, particularly to a wire twist-preventing device in a winding machine for preventing the twist of the wires which are produced when continuously winding, formed of a plurality of lines or wires which are arranged in parallel with one another in a tape shape.

2. Description of the Related Art

In the coil winding machine of this type, when a winding frame, which has a plurality of winding stages winding diameters of which gradually increase upward, is lowered stage by stage, wires supplied through rotating flyers are sequentially wound around each stage of the winding frame to form a coil which is inserted into a coil insertion jig disposed under the winding frame.

Figure 11:
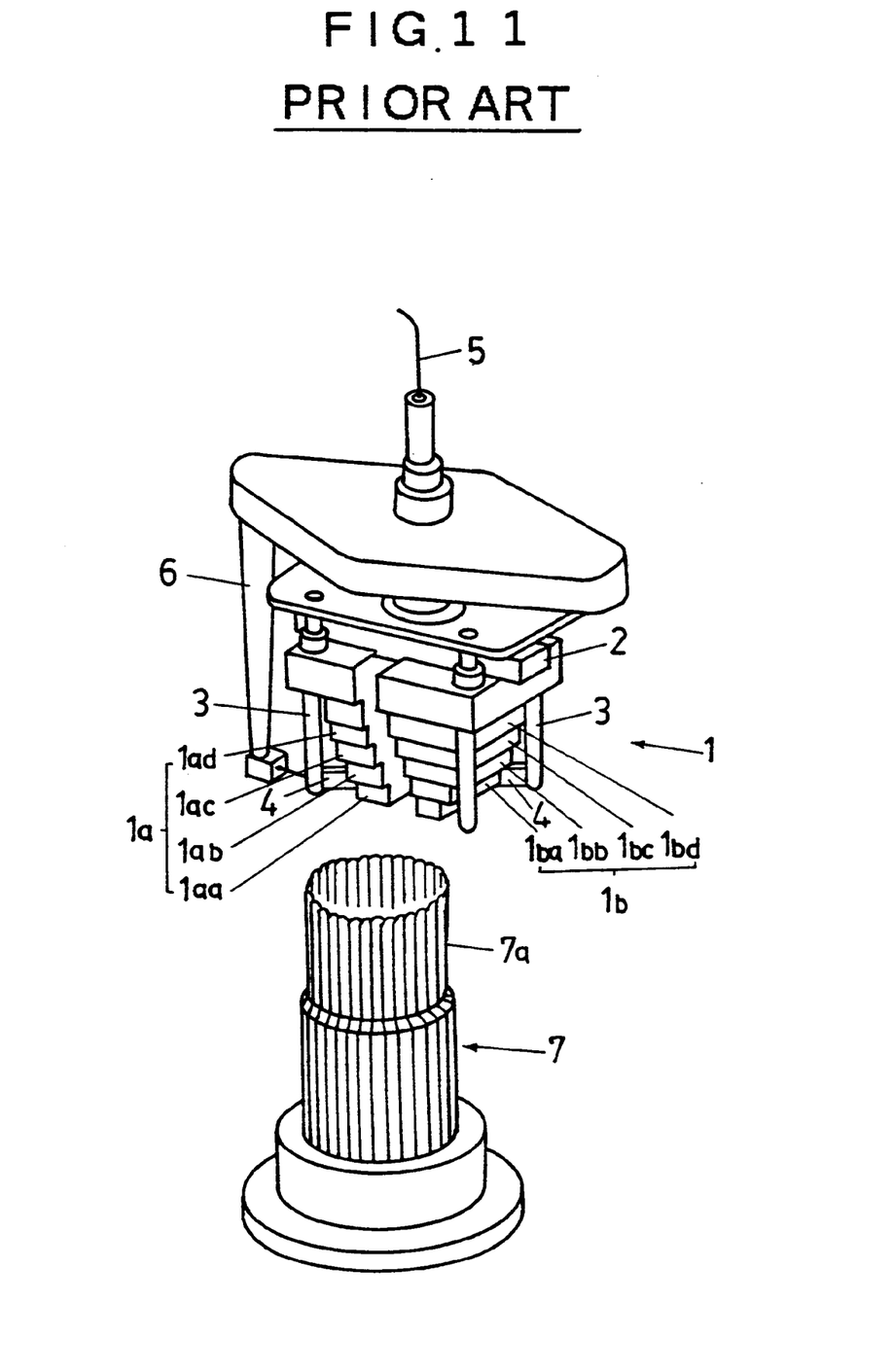
FIG. 11 is a perspective view briefly explaining a main portion of a conventional general winding machine together with a coil insertion jig.

FIG. 11 is a perspective view for briefly explaining a main portion of a conventional winding machine together with a coil insertion jig.

A winding frame 1 comprises a left winding frame 1a and a right winding frame 1b. The left winding frame 1a has a plurality of winding stages 1aa, 1ab, 1ac and 1ad which gradually increase upward in winding diameter, while the right winding frame 1b has a plurality of winding stages 1ba, 1bb, 1bc and 1bd which also gradually increase upward in winding diameter, and the left winding frame 1a and the right winding frame 1b are mounted on a supporting plate 2 which is movable up and down.

Four spindles 3 are provided outside each winding stage of the left and right winding frames 1a and 1b so as to be movable up and down. Pressing plates 4 are radially fixed to the lower ends of each spindle 3 so as to insert up and down into gaps defined but not shown in the left and right winding frames 1a and 1b, wherein when each spindle 3 moves downward, the coil i.e. the wire wound around the winding frame 1 is discharged downward.

A flyer 6 thorough which a wire 5 for forming a coil is inserted is rotatably provided outside these components. When the flyer 6 is rotated about the outer periphery of the winding frame 1, the wire 5 is wound around the winding frame 1 to form a coil.

The coil thus displaced downward by the pressing plates 4 is received by a coil insertion jig 7 having a plurality of blades 7a which are disposed circumferentially thereon, and then it is inserted into the stator core of a motor, not shown.

In the practical winding, the flyer 6 is rotated in a state where the a winding frame 1 is lowered from the state shown in FIG. 11 so that the winding stage 1aa positioned at the lowermost end of the left winding frame 1a slightly bites into the tip end of the coil insertion jig 7. As a result, the wire 5 is wound around the winding stages 1aa and 1ab to form the coil. At the same time, the pressing plates 4 integrated with the spindles 3 are moved up and down so as to move the formed coil sequentially downward, thereby displacing the formed coil from the winding stages 1aa and 1ab. The displaced coil is inserted into gaps of the blades 7a of the coil insertion jig 7 so that most of the formed coil is inserted into the coil insertion jig 7 except a part thereof which remains on the first winding stages 1aa and 1ab at the final stage of the first stage winding.

If a given wire is wound around the first winding stages 1aa and 1ba, the winding frame 1 is lowered by one stage, then the second winding stages 1ab and 1bb are positioned in a winding position so that the wire forming the terminal end portion of the first stage coil formed on the winding stages 1aa and 1ba is guided onto the second stages 1ab and 1bb to form the second stage coil. Most of the second stage coil is inserted into the coil insertion jig 7 except a part thereof which remains on the second winding stages 1ab and 1bb.

Likewise, the wire is wound around third and fourth winding stages 1ac, 1bc, and 1ad, 1bd, and is mostly inserted into the coil insertion jig 7. When a given stage of winding is completed, the spindles 3 are lowered to the lowermost portion and the part of the coil remaining on each winding stage is pressed by the pressing plates 4 and is completely inserted into the coil insertion jig 7, so that the coil winding for the first pole is completed.

Subsequently, the wire forming the terminal end of the coil of the first pole is gripped by a gripper, not shown, and the coil insertion jig 7 is rotated by a given rotary angle in response to the number of poles of the stator core so as to perform a coil winding for the next pole. The wire 5 is cut off to complete the winding for one stator core upon completion of coil winding for given poles.

Figure 12:
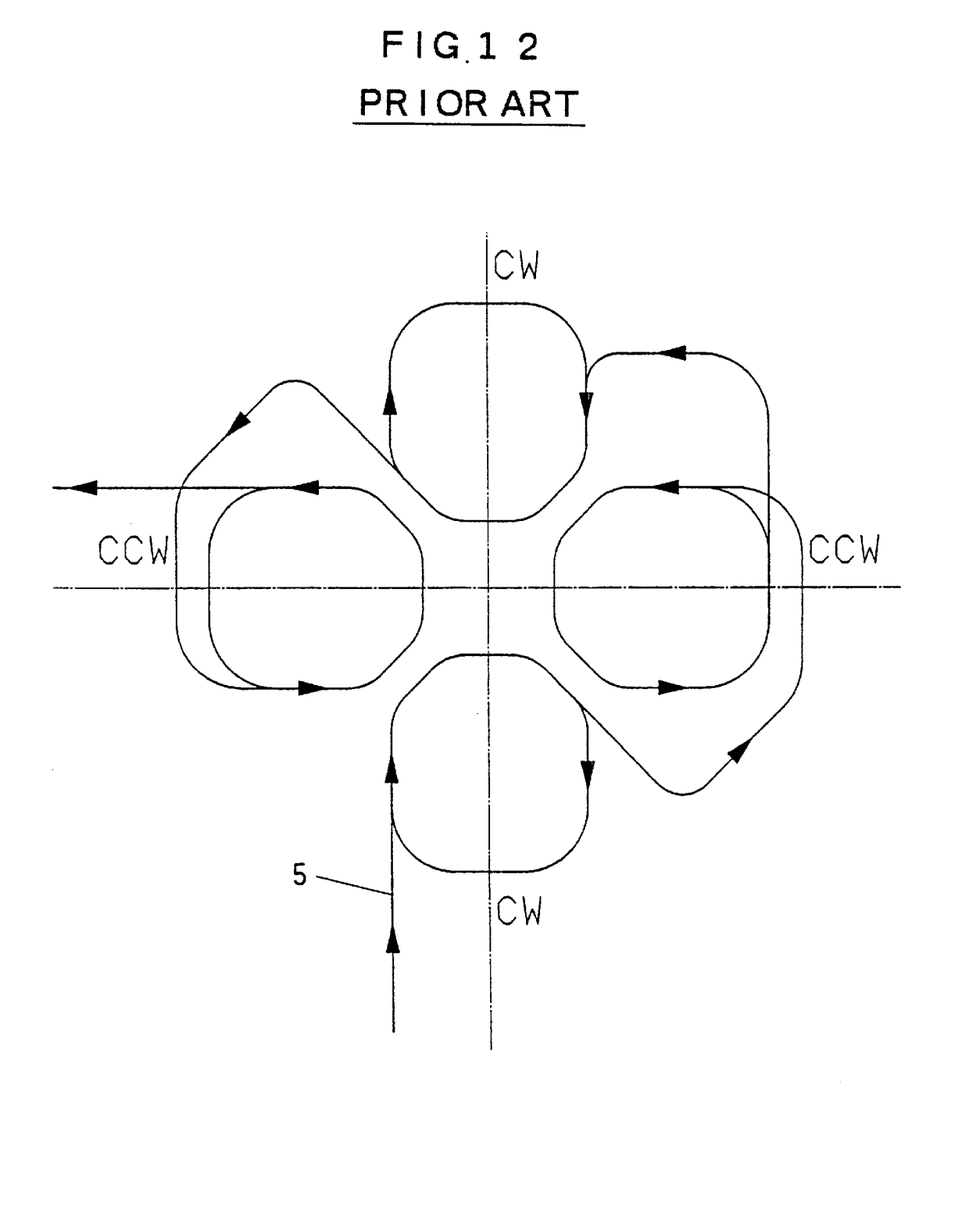
FIG. 12 is a view for explaining the rotating direction of the flyer at the time of continuous winding of a plurality of wires.

As mentioned above, a plurality (even number) of wires are continuously wound when a coil winding for the stator core is usually performed, but the case of four poles of the stator core will be considered for simplifying the explanation. At this time, the rotating direction of the flyer 6 changes in the order of normal rotation→reverse rotation→normal rotation→reverse rotation as shown in FIG. 12 supposing that the clockwise direction CW is referred to as normal rotation and the counterclockwise direction CCW is referred to as reverse rotation.

However, when a plurality of wires, which are arranged in parallel with one another in a tape shape, are wound, the wires are wound around the winding frame in a twisted state during the winding. If the twist is produced in the wires, the thickness of each wire wound around the winding frame in the radial direction of the wire increases by the twisted part, namely, the widths of a plurality of wires.

As a result, there the danger of cutting of the wires because the wires are strained when the wires are inserted into the gaps in each blade of the coil insertion jig 7. There is another danger that the number of regular windings of the wire will be deteriorated, which cause a decline of wire slotfil factor.

The invention has been made to solve the above problems and it is an object of the invention to prevent wire from being twisted at the time of winding with a simple construction.

SUMMARY OF THE INVENTION

To achieve the above object, it is an object of the invention to provide a wire twist-preventing device in a winding machine comprising a winding frame having a plurality of winding stages which gradually increase upward in winding diameter, a plurality of wires which are arranged parallel with one another in a tape shape and are supplied to the winding frame through a tension nozzle and a flyer and a coil insertion jig disposed under the winding frame, wherein the plurality of wires are sequentially wound around each winding stage when the winding frame is lowered stage by stage to form a coil, and the formed coil is subsequently inserted into the coil insertion jig.

The wire twist-preventing device in the winding machine further comprises a dummy flyer provided on the flyer, said dummy flyer being rotatable together with and integrated with the flyer, and a dummy drum rotatably provided coaxially with the winding frame and having a circumferential length which is substantially equal to the average circumferential length of the winding frame, wherein the wires inserted through the tension nozzle are supplied to the winding frame through the flyer to be wound around the winding frame while they are wound around the dummy drum by the dummy flyer, thereby preventing the wires from being twisted.

It is preferable that the dummy flyer and the flyer are secured to a flyer shaft which is rotatably vertically mounted on a horizontal base plate of the winding machine, and the wires are gripped at the tip end by a gripper which is moved vertically together with the winding frame after it is passed through a plurality of guide rollers respectively provided in the dummy flyer and the flyer.

Further, it is preferable that the dummy drum is rotatably mounted on a shaft which is movable up and down while it is screw(bearing)-driven by a servomotor, and the tension nozzle is provided on a supporting table which is movable up and down while it is screw-driven by another servomotor.

Still further, in the wire twist-preventing device in the winding machine, when a plurality of wires are continuously wound by alternately repeating the normal and reverse rotations of the flyer, the wires wound around the dummy drum at the normal rotation of the flyer are preferably unwound from the dummy drum at the reverse rotation of the flyer.

In the wire twist-preventing device in the winding machine for continuously winding a plurality of wires by the normal and reverse rotations of the flyer, the tension nozzle is raised at every given interval and the dummy drum is lowered at every interval corresponding to the given intervals in synchronization with the rotation of the flyer at the normal rotation of the flyer while the tension nozzle is lowered at every given interval and the dummy drum is raised at every interval corresponding to the given intervals in synchronization with the rotation of the flyer at the reverse rotation of the flyer.

With such a construction, at the time of winding by the normal rotation of the flyer, the wires are wound around the dummy drum having a circumferential length which is substantially equal to that of the winding frame by the dummy flyer in the same direction and the same number of windings at the same time when the wires are wound around the winding frame by the flyer, so that the wires can be prevented from being twisted.

Further, at the time of winding by the reverse rotation of the flyer, the wires wound around the dummy drum are unwound by the reverse rotation of the dummy flyer at the same time when the wires are wound around the winding frame by the flyer, so that the wires can be also prevented from being twisted.

It is preferable that the wires are alternately wound around or unwound from the dummy drum by alternately performing normal and reverse rotations of the flyer.

The above and other objects, features and advantages of the invention will be apparent from the following detailed description which is to be read in conjunction with the accompanying drawings.

DETAILED DESCRIPTION OF THE PREFERRED EMBODIMENT

A wire twist-preventing device according to a preferred embodiment of the invention will be described in detail. Components corresponding to those in FIG. 11 are denoted by the same reference numerals.

The general construction of the wire twist-preventing device in a winding machine of the invention is first described with reference to FIG. 1.

A flyer shaft 11 is mounted on a horizontal base plate 10 of the winding machine so as to be rotatable but not to move up and down vertically. A dummy flyer 12 is secured to the upper portion of the flyer shaft 11 and the flyer 6 is secured to the lower portion of the flyer shaft 11, so that the flyer shaft 11 is rotatable in the normal and reverse directions by a servomotor, not shown. A winding shaft 13 is mounted in the flyer shaft 11 so as to be inserted into the central portion of the flyer shaft 11 in such a manner that it is not rotatable but is slidable up and down, and the winding frame 1 is integrated with the lower portion of the winding shaft 13.

A first column 14 is provided upright on a sub-base plate 10a which is integrally secured to the horizontal base plate 10 by way of a sub-column 10b, and a movable frame 15 is mounted on the first column 14 to be displaceable up and down, and a shaft portion 10a is integrally provided with the movable frame 15 at the tip end in the vertical direction thereof, and a dummy drum 16 is rotatably mounted on the shaft portion 10a. The axis of the shaft portion 15a is aligned with the axis of the winding shaft 13, and the circumferential length of the dummy drum 16 is substantially equal to the average circumferential length of the winding frame 1 while the movable frame 15 is screw-driven by a servomotor 17 which is mounted on the top of the first column 14 to move the shaft portion 15a up and down.

Further, a second column 20 is provided upright on the horizontal base plate 10, and a nozzle supporting table 21 is mounted on the second column 20 to be movable up and down. A tension nozzle 22 is provided at the end of the nozzle supporting table 21 close to the first column 14. The wire 5, which is drawn from a wire bobbin, not shown, and to which a given tension is applied by a well known tension device formed of an electromagnetic clutch, etc., is inserted into the tension nozzle 22 and passed through the periphery of the dummy drum 16, then it is guided to an inlet 12a of the dummy flyer 12, and finally it is wound around the dummy drum 16 by the rotation of the dummy flyer 12 which is integrated with the flyer 6.

Figure 1:
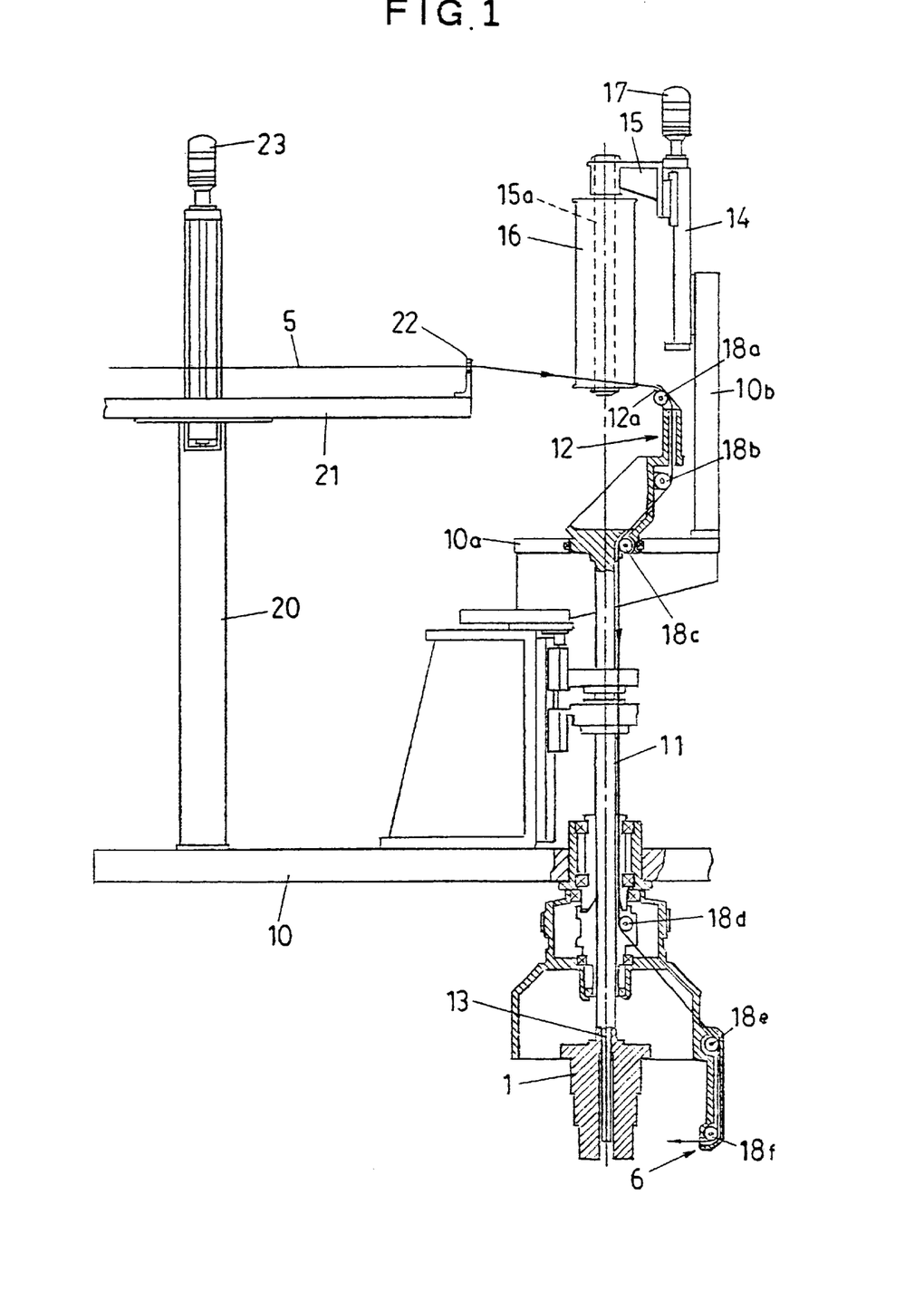
FIG. 1 is a front view of a wire twist-preventing device in an initial state according to a preferred embodiment of the invention wherein a part of which is shown by a sectional view.
Figure 2:
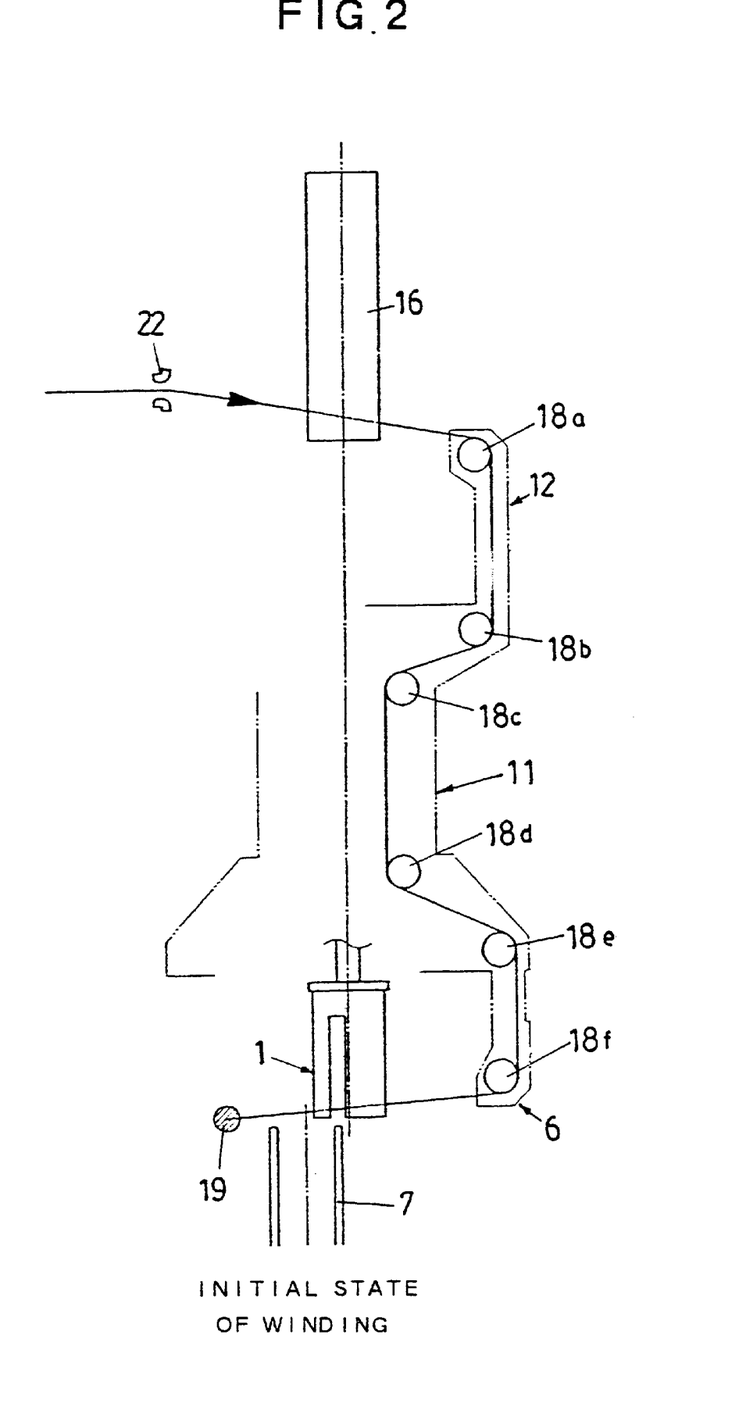
FIG. 2 is a schematic view for explaining the initial state of winding at the time of winding.

The nozzle supporting table 21 is screw-driven by a servomotor 23 mounted on the top of the second column 20 so as to be moved up and down, wherein the dummy drum 16 is in the uppermost raising state while the tension nozzle 22 is in the lowermost lowering state in the initial state where the winding of the stator coil has started as shown in FIGS. 1 and 2.

When the dummy drum 16 is lowered by a given interval and the tension nozzle 22 is raised by the interval which is the same as the lowering interval of the dummy drum 16 in synchronization with the rotation of the flyer 6 and that of the dummy flyer 12 integrated with the flyer 6, in the initial state of winding of the wire as shown in FIGS. 1 and 2, the height of the tension nozzle 22 is set to be higher than the inlet 12a of the dummy flyer 12 by one lead of the wire 5 which is helically wound around the dummy drum 16 when the dummy flyer 12 is rotated one rotation or turn.

The operation of the wire twist-preventing device of the preferred embodiment having such a construction will be next described with reference to FIGS. 2 to 5.

Figure 9:
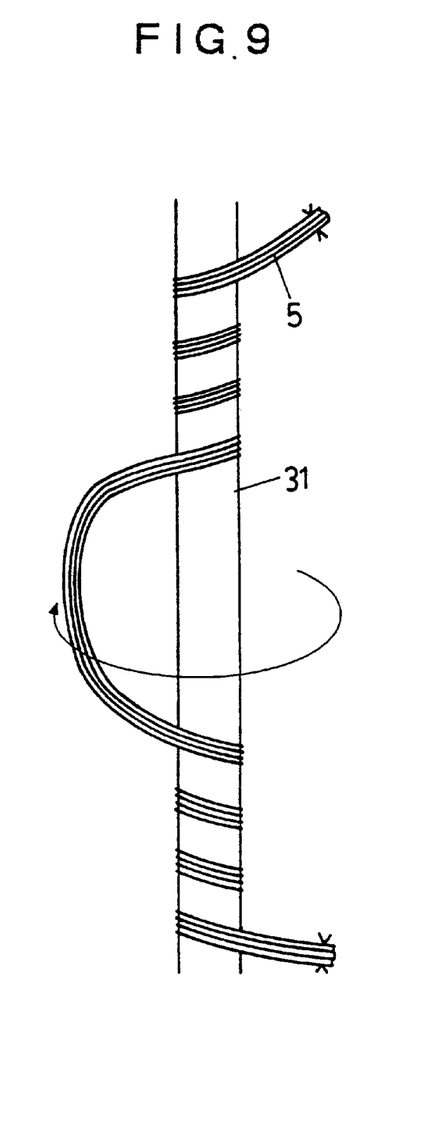
FIGS. 9 and 10 are views for explaining an operating principle of the invention.

In FIGS. 2 to 5, denoted by 18a to 18f are guide rollers for guiding the wire 5, and 19 is a gripper for gripping the tip end of the wire 5. Although the winding frame 1 is cylindrical for simplifying the illustration, it has practically a plurality of winding stages which increase upward in each winding diameter as shown in FIG. 1. Also, the wire 5 is shown by one line, but it practically comprises a plurality of (10 to 15 pieces of) lines or wires which are disposed in parallel with one another in a tape shape as shown in FIG. 9.

Figure 3:
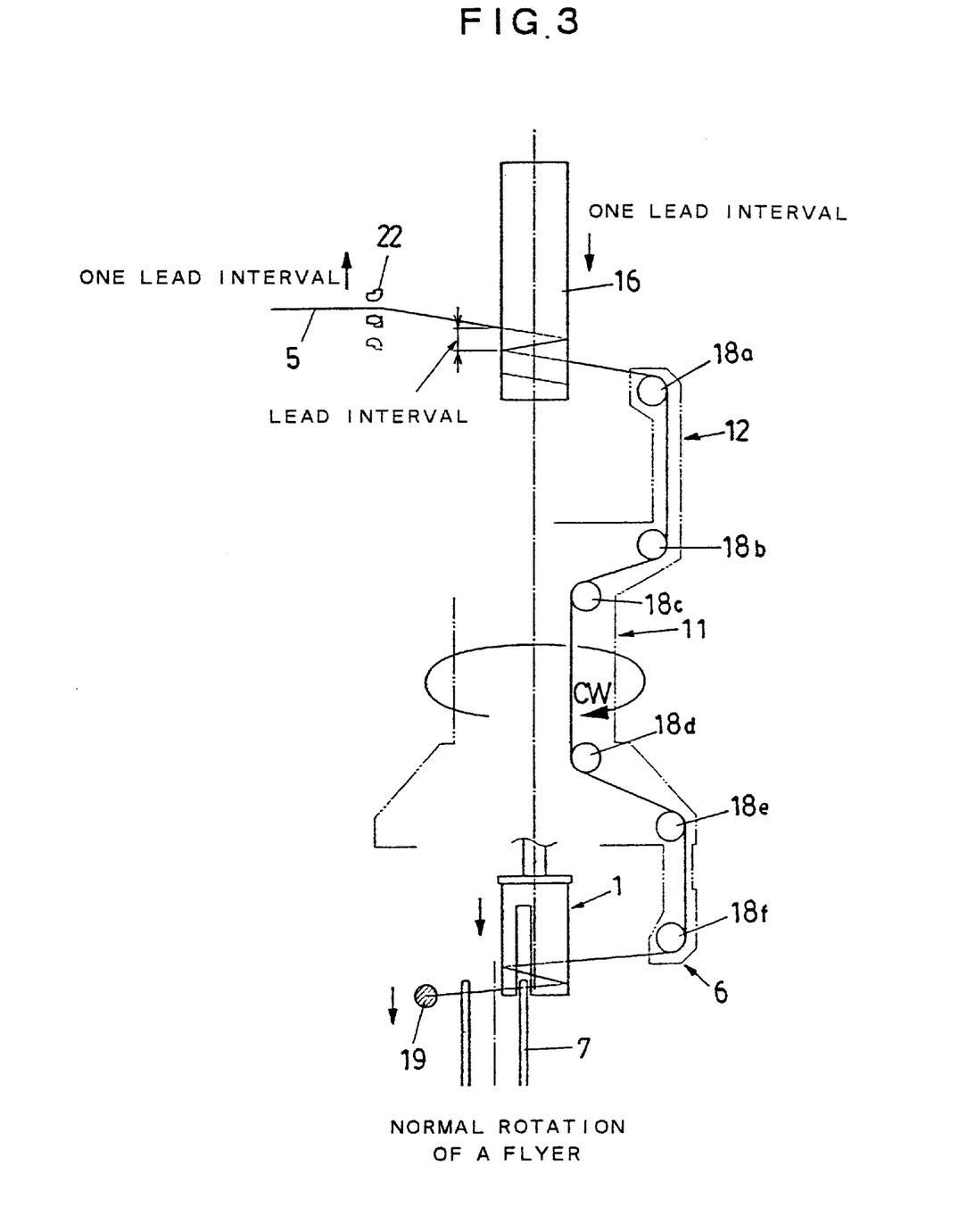
FIG. 3 is a schematic view for explaining the normal rotation of a flyer at the time of winding.

From the initial state shown in FIG. 2, the flyer 6 and the dummy flyer 12 integrated with the flyer 6 are rotated clockwise CW as viewed from above and shown in FIG. 3, in synchronization with which the winding frame 1 is lowered together with the gripper 19 at a given speed. At the same time, the tension nozzle 22 is raised by one lead, and the dummy drum 16 is lowered by one lead. As a result, the flyer 6 is rotated one turn so that the wire 5 is helically wound around the winding frame 1 by one turn while the dummy flyer 12 integrated with the flyer 6 is rotated one turn so that the wire 5 is helically wound around the dummy drum 16 by one turn. These operations are repeated by given turns so that the wire is wound around the winding frame 1.

Since the circumferential length of the dummy drum 16 is substantially equal to the average circumferential length of the winding frame 1, the wire is drawn by the tension device, not shown, by the length corresponding to one turn of the wire wound around the winding frame 1, and to another one turn of the wire wound around the dummy drum 16 as the flyer 6 and the dummy flyer 12 are rotated one turn. Namely, the wire is drawn by a length which is substantially twice the circumferential length of the winding frame 1 from a tension device, not shown. At this time, the winding frame 1 is not rotated, but the wire 5 is drawn by the rotation of the flyer 6 so that the dummy drum 16 is rotated one turn in the same direction as the dummy flyer 12.

Figure 6:
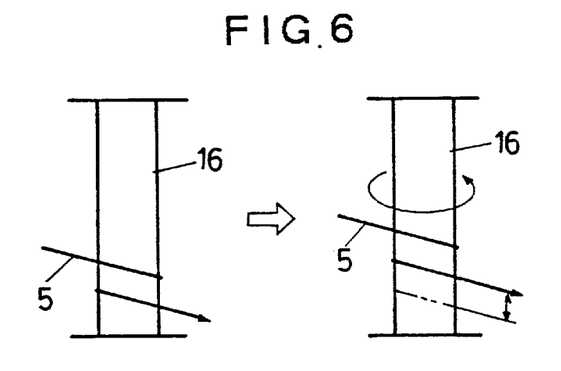
FIGS. 6 to 8 are views for explaining the winding state of the wire around a dummy drum at the time of winding.
Figure 7:
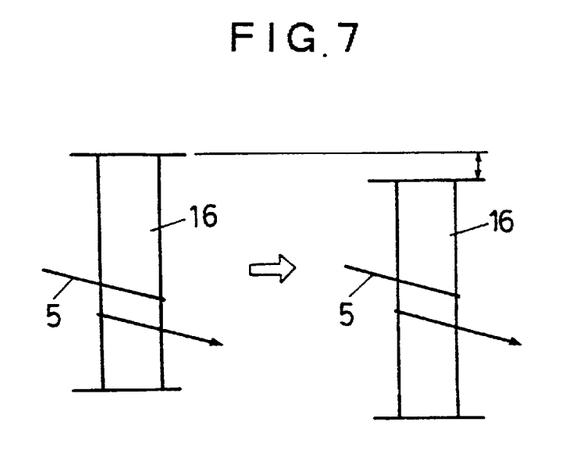
Figure 8:
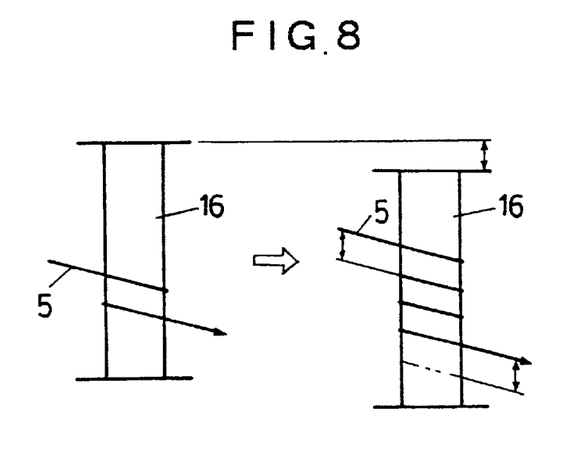

The states of winding around the dummy drum 16 are now described with reference to FIGS. 6, 7 and 8. As shown in FIG. 6, when the wire 5 wound around the dummy drum 16 is simply drawn by one turn corresponding to the length of the same wire wound around the winding frame 1 by the flyer 6 (FIG. 1), the wire 5 is raised by one lead. If the wire 5 is returned to the original position, the dummy drum 16 may be lowered by one lead as shown in FIG. 7. Since the winding of the wire 5 around the dummy drum 16 increases by one turn when the dummy flyer 12 is rotated, the same amount can be compensated by raising the tension nozzle 22 (FIG. 1) by one lead as shown in FIG. 8.

After the first coil winding is completed and dropped in the coil insertion jig 7, the operation transfers to the next coil winding. The next coil winding starts in the manner that the flyer 6 and the dummy flyer 12 are rotated counterclockwise CCW in a state where the winding machine is turned 90° as shown in FIG. 12.

Figure 4:
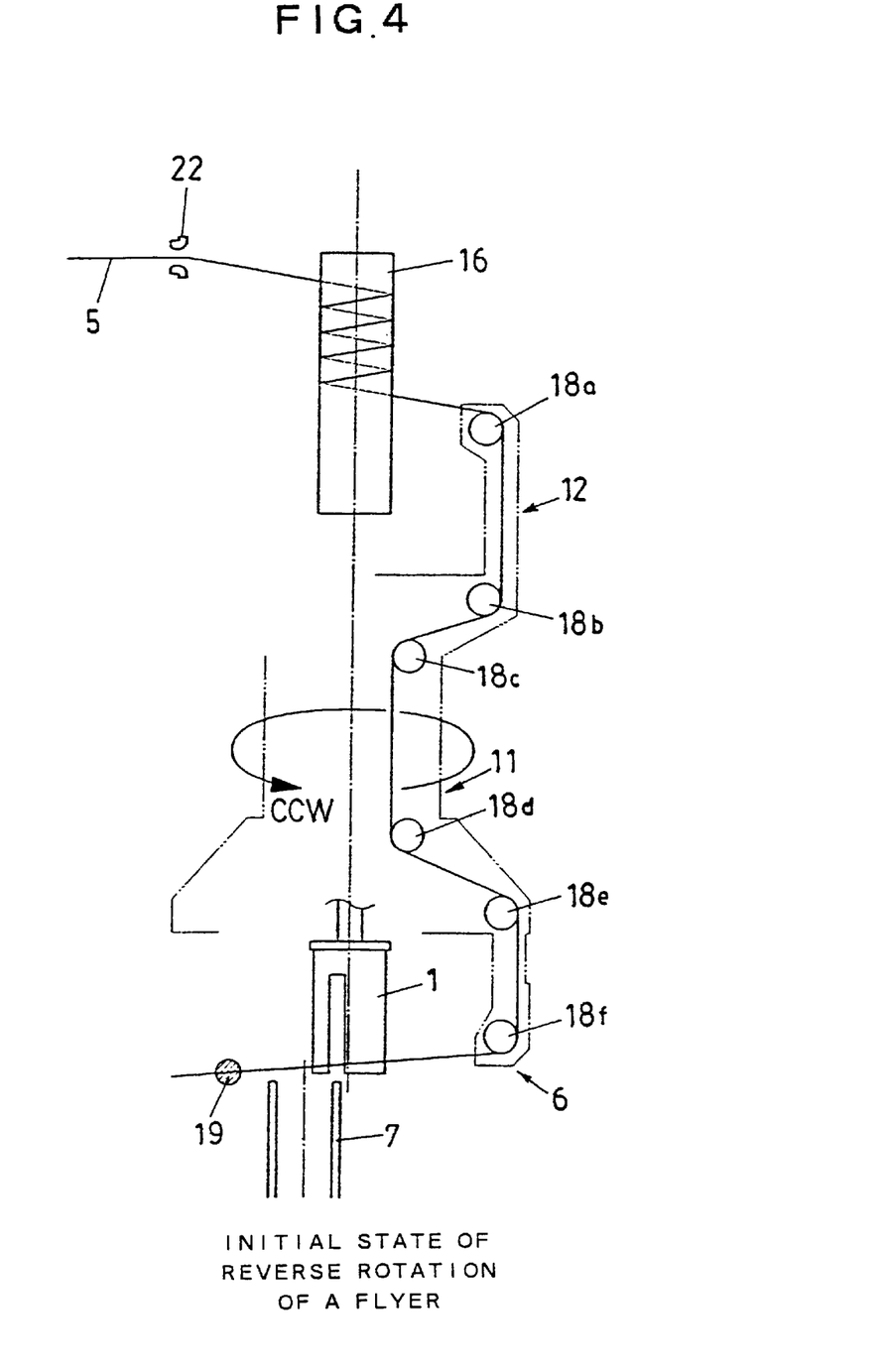
FIG. 4 is a schematic view for explaining the initial state of reverse rotation of the flyer at the time of winding.

FIG. 4 shows a state before the flyer 6 and dummy flyer 12 are rotated, wherein the dummy drum 16 is positioned in the lowering position where the wire 5 is wound therearound, and the tension nozzle 22 is positioned in the raising position. Meanwhile, the winding frame 1 around which no wire is wound is returned to the raising position together with the gripper 19.

Figure 5:
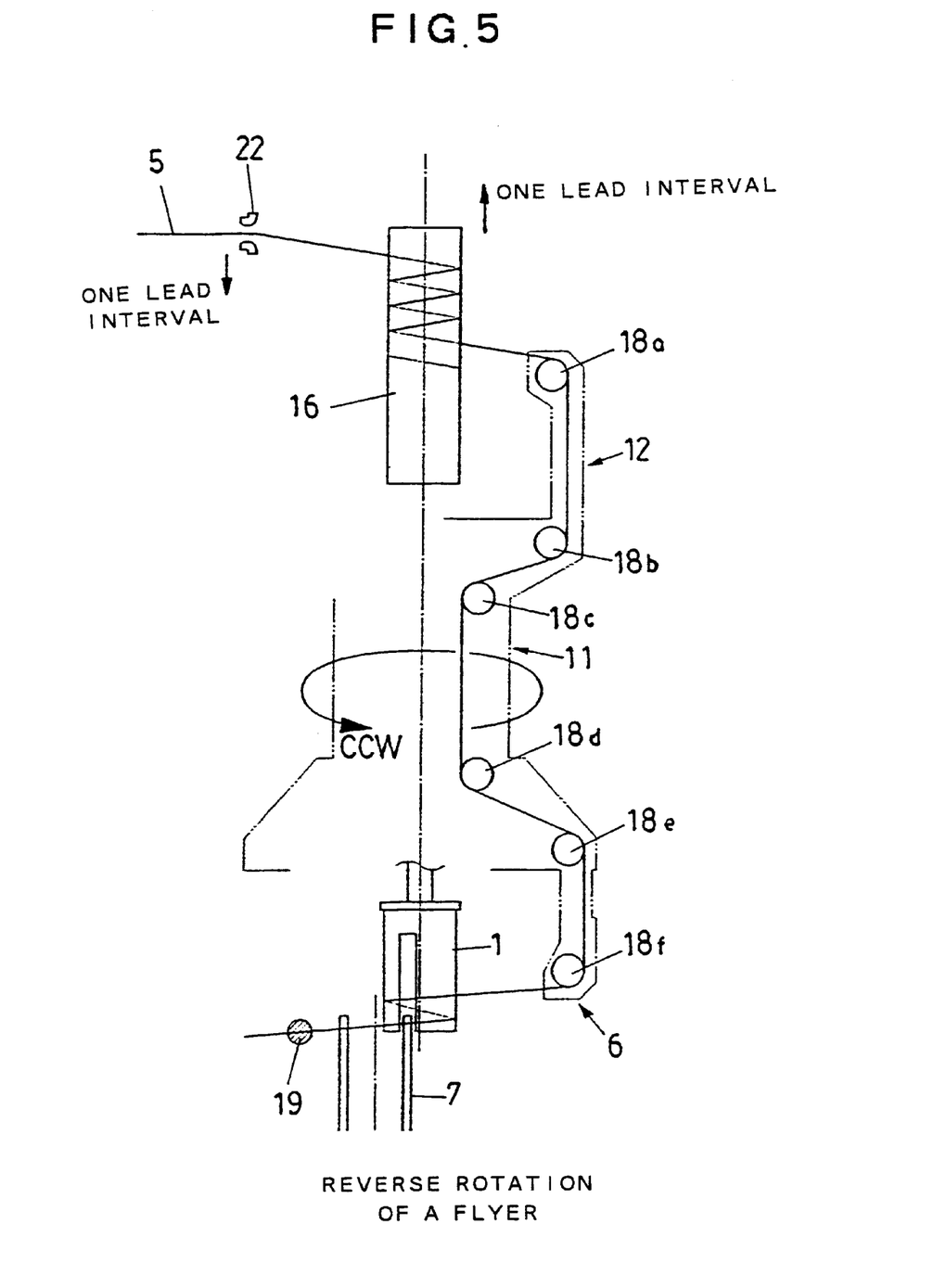
FIG. 5 is a schematic view for explaining the reverse rotation of the flyer at the time of winding.

From this state, the flyer 6 and the dummy flyer 12 are rotated counterclockwise CCW as shown in FIG. 5, in synchronization of which the dummy drum 16 is raised by one lead and the tension nozzle 22 is lowered by one lead, while the winding frame 1 is lowered together with the ripper 19 at a given speed. As a result, the wire 5 wound around the dummy drum 16 is unwound from the dummy drum 16 and then it is wound around the winding frame 1. This operation is repeated by given turns so that the tension nozzle 22 and the dummy drum 16 are returned to the initial state as shown in FIG. 2.

At this time, since the circumferential length of the dummy drum 16 and the average circumferential length of the winding frame 1 are substantially equal to each other, the wire is not drawn form the tension device, not shown, so that the dummy drum 16 is scarcely rotated.

Further, the flyer 6 and the dummy flyer 12 are normally and reversely rotated in a state where the winding machine is turned every 90° as shown in FIG. 12 to complete the winding of one state core.

In such a manner, since the wire 5 wound around the dummy drum 16 at the normal rotation of the flyer 6 and dummy flyer 12 is unwound from the dummy flyer 12 at the reverse rotation of the flyer 6 and dummy flyer 12, the repetition of the normal and reverse rotations of the flyer in the case of continuous winding of a plurality of wires leads to the alternate winding of the wire around and unwinding the same wire from the dummy drum 16, which results in taking advantage of the characteristics of the winding.

The principle of preventing the wire from being twisted with such a construction will be now described with reference to FIGS. 9 and 10.

FIG. 9 is a view for explaining the basic principle of the invention. When the wire 5, which is not twisted and has the shape of tape, and fixed at the both ends thereof, is wound clockwise around a cylindrical drum 31 which is provided upright in the vertical direction while it is held at the center thereof, the wire 5 is wound around the drum 31 helically at the upper and lower portions thereof without being twisted.

Figure 10:
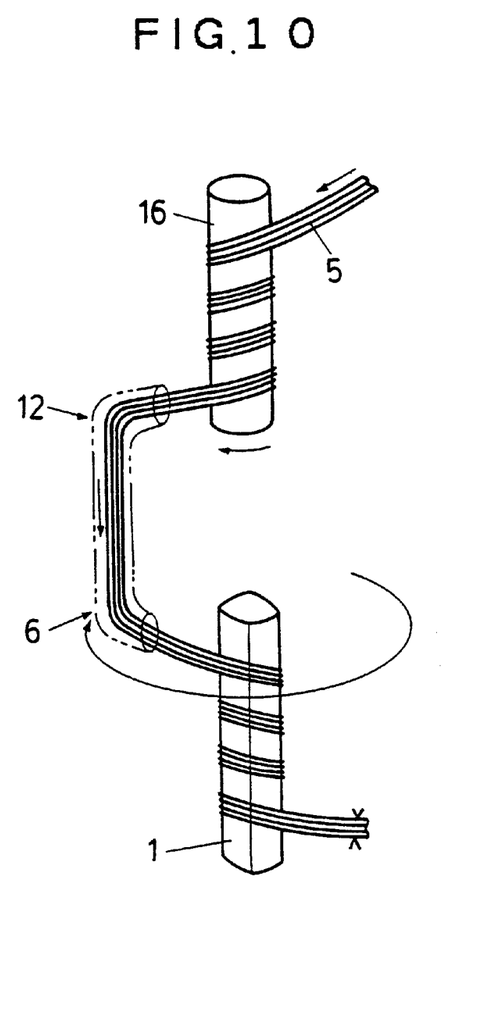

FIG. 10 is a view showing a state where the basic principle is applied to the winding machine, wherein the drum 31 of FIG. 9 is divided into the winding frame 1 and the dummy drum 16, and the center of the wire 5 is held by the dummy flyer 12 integrated with the flyer 6, wherein the wire 5 is wound clockwise, and it is supported by the tension nozzle 22 (FIG. 1) to be inserted therethrough while the upper end of the wire 5 is not fixed.

Accordingly, the wire 5 in FIG. 9 is different from that in FIG. 10 in that the upper end of the wire 5 is fixed or not, and in either case the wire 5 is wound without being twisted.

Although the above preferred embodiment shows the case where a plurality of tape-shaped wires are wound, it is possible to wind a single wire using this winding machine. Further, the number of wires which are continuously wound is not limited to four, but it may be any number if it is an even number. If the number of wires is an odd number, the dummy drum 16 and the tension nozzle 22 may be returned to the initial position as shown in FIG. 2 upon completion of the last winding of the wire.

As mentioned above, the wire twist-preventing device in the winding machine of the invention is constructed in such a manner that the wire is wound around the winding frame and the dummy drum having the same circumferential length at the same time to prevent the wire from being twisted in principle, so that in the case of winding a plurality of wires which are disposed parallel with one another in a tape shape, the wire can be easily dropped in the coil insertion jig so as to prevent the cutting of the wire and improving various factors, including the slotfil factor.

The aforementioned dummy flyer and the flyer are respectively secured to the flyer shaft which is vertically rotatably mounted on the horizontal substrate of the winding machine, and hence the dummy flyer can be rotated together with the flyer about the same axis of the flyer with a simple construction. Further, the wire is passed through a plurality of guide rollers respectively provided in the dummy flyer and the flyer, and is gripped at the upper end by the gripper which is moved up and down together with the winding frame so that the tip end of the wire can be held with assurance regardless of the up and down motion of the winding frame.

Still further, since the dummy drum is mounted rotatably on the shaft portion which is movable up and down while it is screw-driven by the servomotor, it can be moved up and down in association with the rotation of the flyer with high accuracy and with a simple construction. Since the tension nozzle is supported by the nozzle supporting table which is movable up and down while it is screw-driven by the servomotor, it can be moved up and down with high accuracy and with a simple construction.

Still more further, in the wire twist-preventing device in the winding machine, when the normal and reverse rotations of the flyer are alternately repeated to continuously wind a plurality of wires, the dummy flyer integrated with the flyer likewise repeats the normal and reverse rotations. Accordingly, the wire is repeatedly wound around and unwound from the dummy drum, particularly in the case of continuously winding an even number of wires, and the dummy drum is returned to a state which is the same as the initial state upon completion of the last winding of the wire, which is very advantageous.

When a plurality of wires are continuously wound, the tension nozzle is raised by a given interval, and the dummy drum is lowered by the interval which is the same as the raising interval at the normal rotation of the flyer, while the tension nozzle is lowered by a given interval and the dummy drum is raised by the interval which is the same as the lowering interval at the reverse rotation of the flyer, so that the wire can be wound helically around the winding frame and the dummy drum by the same number of rotation with a simple construction.

What is claimed is:

1. A wire twist-preventing device in a winding machine comprising:

a winding frame having a plurality of winding stages which gradually increase upward in winding diameter, a plurality of wires which are arranged parallel with one another in a tape shape and are supplied to the winding frame through a tension nozzle and a flyer and a coil insertion jig disposed under the winding frame, wherein the plurality of wires is sequentially wound around each winding stage when the winding frame is lowered stage by stage to form a coil, and the formed coil is subsequently inserted into the coil insertion jig;

said device further comprising:

a dummy flyer provided on the flyer, said dummy flyer being rotatable together with and integrated with the flyer; and a dummy drum rotatably provided coaxially with the winding frame and having a circumferential length which is substantially equal to an average circumferential length of the winding frame;

wherein the wires inserted through the tension nozzle are supplied to the winding frame through the flyer, and wherein, in at least one direction of rotation of the flyer, the dummy drum is repeatedly lowered and the tension nozzle is repeatedly raised a same interval in synchronization with the rotation of the flyer so that the wire is wound around the dummy drum by the dummy flyer while it is wound around the winding frame by the flyer, thereby preventing the wires from being twisted.

2. The wire twist-preventing device according to claim 1, wherein the dummy flyer and the flyer are secured to a flyer shaft which is rotatably vertically mounted on a horizontal base plate of the winding machine.

3. The wire twist-preventing device according to claim 1, wherein the wires are gripped at the tip end by a gripper which is moved vertically together with the winding frame after it is passed through a plurality of guide rollers respectively provided in the dummy flyer and the flyer.

4. The wire twist-preventing device according to claim 1, wherein the dummy drum is rotatably mounted on a shaft portion which is movable up and down while it is screw-driven by a servomotor.

5. The wire twist-preventing device according to claim 1, wherein the tension nozzle is provided on a nozzle supporting table which is movable up and down while it is screw-driven by the servomotor.

6. The wire twist-preventing device according to claim 1, wherein when a plurality of wires are continuously wound by alternately repeating the normal and reverse rotations of the flyer, the wires wound around the dummy drum at the normal rotation of the flyer are unwound from the dummy drum at the reverse rotation of the flyer.

7. The wire twist-preventing device according to claim 6, wherein the tension nozzle is raised and the dummy drum is lowered the same given interval in synchronization with the rotation of the flyer at the normal rotation of the flyer.

8. The wire twist-preventing device according to claim 6, wherein the tension nozzle is lowered and the dummy drum is raised the same given interval in synchronization with the rotation of the flyer at the reverse rotation of the flyer.

* * * * *